(12) United States Patent
Cosgrove et al.

(10) Patent No.: US 10,696,134 B2
(45) Date of Patent: Jun. 30, 2020

(54) VEHICLE COOLANT FLOW CONTROL DURING MAXIMUM AC COOLING CONDITION

(71) Applicant: Toyota Motor Engineering & Manufacturing North America, Inc., Erlanger, KY (US)

(72) Inventors: David W. Cosgrove, Royal Oak, MI (US); Hidekazu Hirabayashi, Ann Arbor, MI (US)

(73) Assignee: Toyota Motor Engineering & Manufacturing North America, Inc., Plano, TX (US)

(*) Notice: Subject to any disclaimer, the term of this patent is extended or adjusted under 35 U.S.C. 154(b) by 422 days.

(21) Appl. No.: 15/434,521

(22) Filed: Feb. 16, 2017

(65) Prior Publication Data

US 2018/0229584 A1    Aug. 16, 2018

(51) Int. Cl.
| B60H 1/00 | (2006.01) |
| B60H 1/12 | (2006.01) |
| B60H 1/32 | (2006.01) |
| B60H 1/08 | (2006.01) |

(52) U.S. Cl.
CPC ....... B60H 1/00807 (2013.01); B60H 1/0005 (2013.01); B60H 1/08 (2013.01); B60H 1/3211 (2013.01)

(58) Field of Classification Search
CPC ........... B60H 1/00885; B60H 1/00007; B60H 1/00807; B60H 1/3204; B60H 1/12; B60H 1/00821; B60H 2001/3261; B60H 2001/3238
See application file for complete search history.

(56) References Cited

U.S. PATENT DOCUMENTS

| 5,967,101 A | 10/1999 | Roth et al. |
| 6,607,142 B1 | 8/2003 | Boggs et al. |
| 6,745,726 B2 | 6/2004 | Joyce et al. |
| 9,273,591 B2 | 3/2016 | DiPaola et al. |
| 2008/0034767 A1* | 2/2008 | Ziehr ................. B60H 1/00385 62/180 |
| 2009/0283604 A1 | 11/2009 | Martinchick et al. |

(Continued)

*Primary Examiner* — Jelani A Smith
*Assistant Examiner* — Majdi Alsomiri
(74) *Attorney, Agent, or Firm* — Christopher G. Darrow; Darrow Mustafa PC

(57) ABSTRACT

Systems and methods can determine whether an air conditioning (AC) system of the vehicle is being operated under a maximum cooling condition. Responsive to determining that the AC system is being operated under the maximum cooling condition, it can be determined whether vehicle fluid temperatures meet associated predetermined thresholds. If none of the vehicle fluid temperatures meet the associated predetermined thresholds, a heater core valve can be switched to a closed position to reduce a flow rate of the coolant through a heater core. If one or more of the vehicle fluid temperatures meet the associated predetermined thresholds, the heater core valve can be switched to an open position to increase the flow rate of the coolant through the heater core. Such systems can force coolant to flow through the heater core to reduce vehicle fluid temperatures even when the AC system is being operated under the maximum cooling condition.

13 Claims, 4 Drawing Sheets

(56) References Cited

U.S. PATENT DOCUMENTS

| | | | |
|---|---|---|---|
| 2009/0314847 A1* | 12/2009 | Nemoto | B60H 1/00764 237/5 |
| 2011/0016896 A1* | 1/2011 | Oomura | B60H 1/00785 62/155 |
| 2014/0053590 A1* | 2/2014 | Madhavan | B60H 1/00764 62/244 |
| 2014/0142819 A1 | 5/2014 | Pursifull et al. | |
| 2014/0238056 A1* | 8/2014 | Kawakami | F25B 31/008 62/89 |
| 2015/0115048 A1 | 4/2015 | Brodie et al. | |
| 2016/0159203 A1 | 6/2016 | Kuroda et al. | |
| 2016/0209092 A1 | 7/2016 | Kuroda et al. | |
| 2016/0221417 A1* | 8/2016 | Ito | B60H 1/2221 |

* cited by examiner

VEHICLE COOLANT FLOW CONTROL DURING MAXIMUM AC COOLING CONDITION

FIELD

The subject matter described herein relates in general to vehicle cooling systems, and more particularly, to the control of the flow of coolant during maximum air conditioning (AC) cooling conditions.

BACKGROUND

Vehicles can include cooling systems to remove waste heat from various systems and components, such as a vehicle engine. Such cooling systems can include a liquid coolant that is circulated through different components. For example, the coolant can be circulated through a radiator to allow the coolant to be cooled by a nearby fluid (such as air). The coolant can flow through a vehicle engine to allow heat to transfer from the engine to the coolant. The coolant can then flow through one or more heat exchangers to change temperature characteristics in one or more vehicle systems. For example, one of the heat exchanges can include a heater core that allows heat from the coolant to be transferred to nearby air flowing into a passenger compartment of the vehicle. Other heat exchanges can include accessory cooling components. For example, a heat exchanger can draw heat from a vehicle transmission. The warm coolant flowing through the heat core can provide undesired heating of the passenger compartment during which cool air is requested for the passenger compartment.

SUMMARY

In one example, the present disclosure is directed to a method of controlling a cooling system of a vehicle. The cooling system provides a flow path for a coolant and includes a heater core positioned in parallel with at least one accessory cooling heat exchanger. The cooling system further includes a heater ore valve configured to control a flow rate of coolant through the heater core. The method includes determining whether an air conditioning (AC) system of the vehicle is being operated under a maximum cooling condition. Responsive to determining that the AC system is being operated under the maximum cooling condition, it is determined whether one or more of a set of vehicle fluid temperatures meet associated predetermined thresholds. If each of the vehicle fluid temperatures of the set of vehicle fluid temperatures do not meet the associated predetermined thresholds, the heater core valve is switched to a closed position to reduce a flow rate of the coolant through the heater core. If one or more of the set of vehicle fluid temperatures meet the associated predetermined thresholds, the heater core valve is switched to an open position to increase the flow rate of the coolant through the heater core.

In another example, the present disclosure is directed to a method of controlling a cooling system of a vehicle. The cooling system provides a flow path for a coolant and includes a heater core positioned in parallel with at least one accessory cooling heat exchanger. The cooling system further includes a heater core valve configured to control a flow rate of coolant through the heater core. The method includes determining whether an air conditioning (AC) system of the vehicle is in an ON state and determining whether the AC system is being operated under a maximum cooling condition. Responsive to determining that the AC system is being operated under the maximum cooling condition, the heater core valve is switched to a closed position. The method includes determining whether one or more of a set of vehicle fluid temperatures meet associated predetermined thresholds. If one or more of the set of vehicle fluid temperatures meet the associated predetermined thresholds, switching the heater core valve to an open position.

In yet another example, the present disclosure is directed to a vehicle cooling system. The system includes a heater core positioned in parallel with at least one accessory cooling heat exchanger. The system also includes a heater core valve configured to control a flow rate of coolant through the heater core. One or more controllers are operatively connected to the heater core valve and an air conditioning (AC) system. Further included is a memory operatively connected to the one or more controllers. The memory includes instructions that, when executed by the one or more controllers, cause the one or more controllers to determine whether the AC system of the vehicle is being operated under a maximum cooling condition. Responsive to determining that the AC system is being operated under the maximum cooling condition, the instructions can cause the one or more controllers to determine whether one or more of a set of vehicle fluid temperatures meet associated predetermined thresholds. If each of the vehicle fluid temperatures of the set of vehicle fluid temperatures do not meet the associated predetermined thresholds, the heater core valve can be switched to a closed position to reduce a flow rate of the coolant through the heater core. If one or more of the set of vehicle fluid temperatures meet the associated predetermined thresholds, the heater core valve can be switched to an open position to increase the flow rate of the coolant through the heater core.

DETAILED DESCRIPTION

Figure 1:
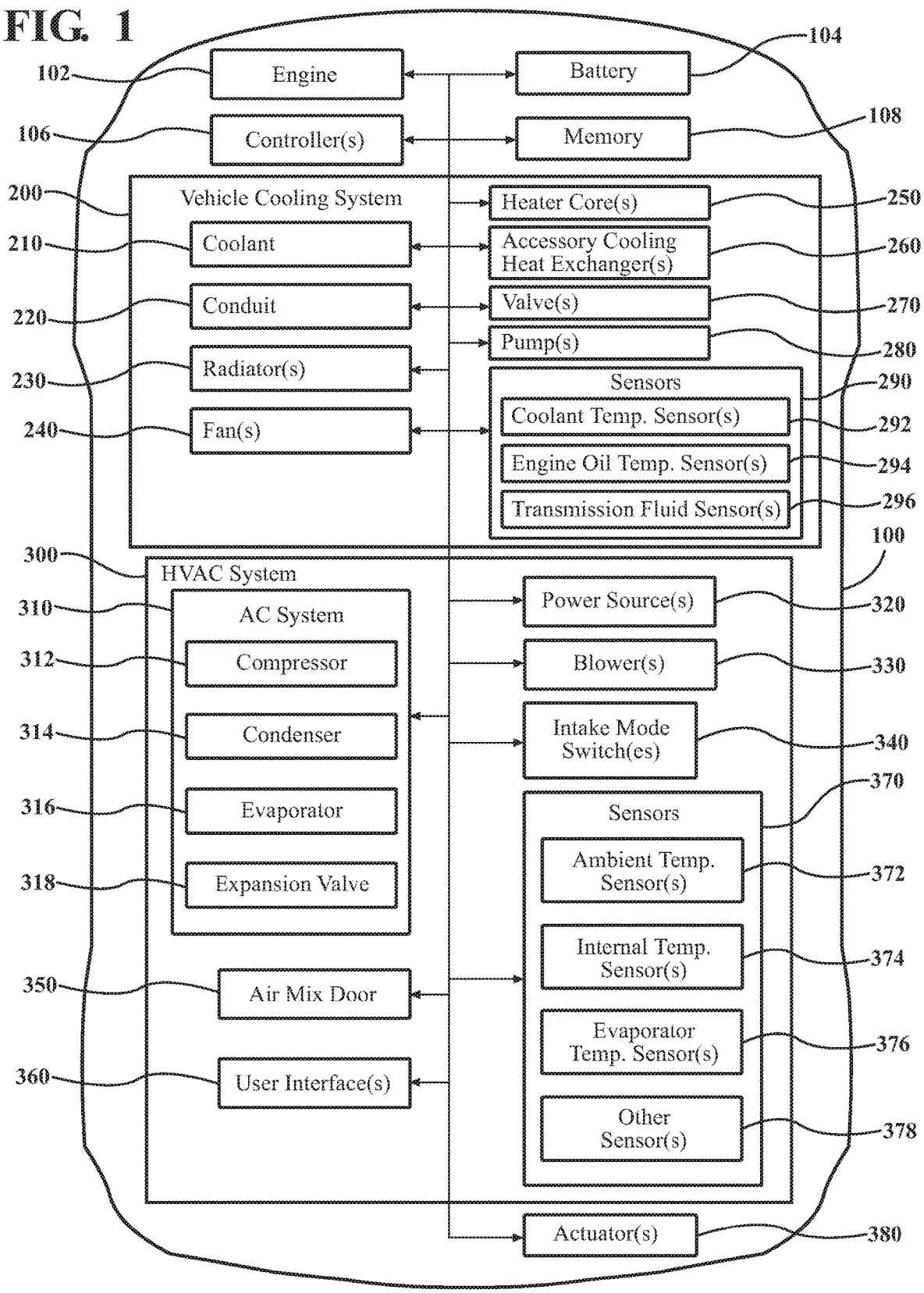
FIG. 1 is a block diagram illustrating an example of a vehicle having a vehicle cooling system and a heating, ventilating, and air conditioning (HVAC) system.

This detailed description relates to the operation of vehicle cooling systems. The vehicle cooling system can be a closed circuit system having a coolant that can flow through the cooling system. The cooling system can include a heater core positioned in parallel with at least one accessory cooling heat exchanger. A heater core valve can be configured to control a flow rate of coolant through the heater core. Systems and methods can determine whether an air conditioning (AC) system of the vehicle is being operated under a maximum cooling condition. Responsive to determining that the AC system is being operated under the maximum cooling condition, it can be determined whether vehicle fluid temperatures meet associated predetermined thresholds. If none of the vehicle fluid temperatures meet the associated predetermined thresholds, the heater core valve can be switched to a closed position to reduce a flow rate of the coolant through the heater core. If one or more of the vehicle fluid temperatures meet the associated predetermined thresholds, the heater core valve can be switched to an open position to increase the flow rate of the coolant through the heater core. The present detailed description relates to systems and methods that incorporate one or more of such features. In at least some instances, such systems and methods can force coolant to flow through the heater core to reduce vehicle fluid temperatures even when the AC system is being operated under the maximum cooling condition.

Detailed embodiments are disclosed herein; however, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-4B, but the embodiments are not limited to the illustrated structure or application.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details.

Referring to FIG. 1, an example a vehicle 100 is shown. As used herein, "vehicle" means any form of motorized transport. In one or more implementations, the vehicle 100 can be an automobile. While arrangements will be described herein with respect to automobiles, it will be understood that embodiments are not limited to automobiles. In some implementations, the vehicle 100 may be a watercraft, an aircraft or any other form of motorized transport.

Some of the possible elements of the vehicle 100 are shown in FIG. 1 and will now be described. It will be understood that it is not necessary for the vehicle 100 to have all of the elements shown in FIG. 1 or described herein. The vehicle 100 can have any combination of the various elements shown in FIG. 1. Further, the vehicle 100 can have additional elements to those shown in FIG. 1. In some arrangements, vehicle 100 may not include one or more of the elements shown in FIG. 1. Further, while the various elements are shown as being located within the vehicle 100 in FIG. 1, it will be understood that one or more of these elements can be located external to the vehicle 100. Further, the elements shown may be physically separated by large distances. In one or more arrangements, the vehicle 100 can include a cooling system 200 and a heating, ventilating, and air conditioning (HVAC) system 300.

The vehicle 100 can include an engine 102 to generate power. As used herein, "engine" can include any component or group of components of the vehicle 100 that generates and/or transfers power used by the vehicle 100 for movement. The engine can be any suitable type of engine or motor, now known or later developed. For instance, the engine can be an internal combustion engine, an electric motor, a steam engine, and/or a Stirling engine, just to name a few possibilities. In some embodiments, the engine can include a plurality of engine types. For instance, a gas-electric hybrid vehicle can include a gasoline engine and an electric motor.

The engine 102 can include an energy source to at least partially power the engine 102. The engine 102 can be configured to convert energy from the energy source into mechanical energy. Examples of energy sources include gasoline, diesel, propane, hydrogen, other compressed gas-based fuels, ethanol, solar panels, batteries, and/or other sources of electrical power. Alternatively or in addition, the energy source can include fuel tanks, batteries, capacitors, and/or flywheels. In some embodiments, the energy source can be used to provide energy for other systems of the vehicle 100. During a conversion of energy from the energy source into mechanical energy, the engine 102 can produce heat.

The vehicle 100 can include a battery 104 to store electrical energy for the vehicle 100. The battery 104 can provide electrical energy to power a variety of vehicle systems. For instance, the battery 104 can power a vehicle ignition system, lights, on-board electronics, as well as any other electronic device connected within the vehicle 100. In one or more arrangements, the battery 104 can be a lead-acid battery including six 2.1 volt cells to provide a nominally 12-volt battery system. The battery 104 can be configured for recharging by the engine 102. In one or more arrangements, the battery 104 can provide an energy source for the engine 102.

The vehicle 100 can include one or more controllers 106. As used herein, "controller" means any component or group of components that are configured to execute any of the processes described herein or any form of instructions to carry out such processes or cause such processes to be performed. The controller(s) 106 may be implemented with one or more general-purpose and/or one or more special-purpose processors. Examples of suitable processors include microprocessors, microcontrollers, DSP processors, and other circuitry that can execute software. Further examples of suitable processors include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a processor. The controller(s) 106 can include at least one hardware circuit (e.g., an integrated circuit) configured to carry out instructions contained in program code. In arrangements in which there is a plurality of controllers 106, such controllers can work independently from each other or one or more controllers can work in combination with each other. In one or more arrangements, the controller(s) 106 can include a main processor of the vehicle 100. For instance, the controller(s) 106 can include an electronic control unit (ECU). In some arrangements, the controller(s) 106 can be integrated within the cooling system 200 and/or the HVAC system 300. For instance, the controller(s) 106 can include one or more cooling system controllers and/or one or more HVAC system controllers. Alternatively or in addition, the controller(s) 106 can be operatively connected to one or more elements of the cooling system 200 and/or the HVAC system 300. The term "operatively connected," as used throughout this description, can include direct or indirect connections, including connections without direct physical contact. Although shown as an element of the vehicle 100, the controller(s) 106 can include remote controllers in communication with one or more elements of the vehicle 100.

The vehicle 100 can include memory 108 and/or one or more other data stores for storing one or more types of data. The memory 108 can include volatile and/or non-volatile memory. Examples of suitable memory 108 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The memory 108 can be a component of the controller(s) 106, or the memory 108 can be operatively connected to the controller(s) 106 for use thereby. In one or more arrangements, the memory 108 can include instructions to allow the controller 106 to control one or more elements of the cooling system 200 and/or the HVAC system 300. In some arrangements, the memory 108 can be integrated within the cooling system 200 and/or the HVAC system 300. Alternatively or in addition, the memory 108 can be operatively connected to one or more elements of the cooling system 200 and/or the HVAC system 300.

The vehicle 100 can include the cooling system 200 to remove waste heat from one or more vehicle components. Some of the possible elements of the vehicle cooling system 200 are shown in FIG. 1 and will be described. It will be understood that it is not necessary for the cooling system 200 to have all of the elements shown in FIG. 1 or described herein. The vehicle cooling system 200 can have any combination of the various elements shown in FIG. 1. Further, the vehicle cooling system 200 can have additional elements to those shown in FIG. 1.

The cooling system 200 can include a coolant 210 to transfer heat from one or more components of the vehicle 100. The coolant 210 can be any fluid configured to provide a medium to transfer heat from one or more vehicle components to other components and/or ambient air. In one or more arrangements, the coolant 210 can be water. In some arrangements, water coolant can include one or more additives, such as corrosion inhibitors and antifreeze. Alternatively or in addition, the coolant 210 can include one or more oils. In one or more arrangements, the cooling system 200 is a closed circuit system. For example, the coolant 210 can cycle through the cooling system 200, and elements contained therein, multiple times.

The cooling system 200 can include a conduit 220 to allow the movement of the coolant 210 throughout the cooling system 200. The conduit 220 can have any suitable configuration to allow the conveyance of a fluid coolant 210 throughout the cooling system 200. For instance, the conduit 220 can include a series of tubes or pipes connecting the cooling system 200 to vehicle components. Further, the conduit 220 can include one or more passages within vehicle components. For example, the conduit 220 can include passages within the engine 102 that the coolant 210 can flow through.

The cooling system 200 can include one or more radiators 230. The radiator(s) 230 can be any suitable heat exchanger(s) that allows thermal energy to be transferred from the coolant 210 to an environment around the radiator(s) 230. For instance, warm coolant 210 can flow through a radiator core within the radiator(s) 230. The radiator core can include a series of tubes. Further, the radiator core can include one or more fins attached to the tubes. Heat from the coolant 210 can be transferred through the tubes and/or fins to surrounding air.

The cooling system 200 can include one or more fans 240 to move air towards the radiator(s) 230. The fan(s) 240 can increase a volumetric flow rate of air through the radiator core, increasing an amount of heat transferred from the coolant 210. In one or more arrangements, the fan(s) 240 can be powered by the engine 102 and/or the battery 104.

Figure 2:
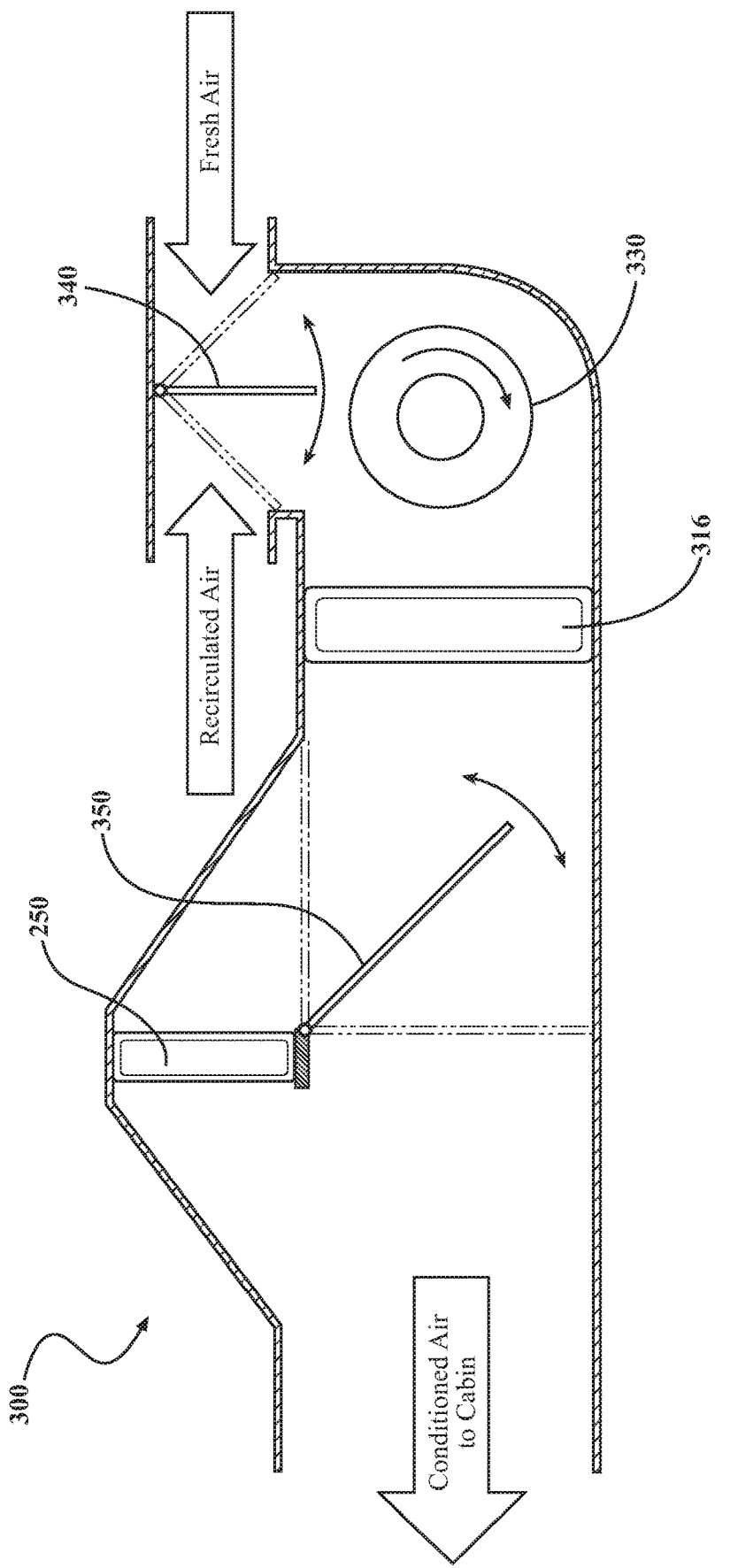
FIG. 2 is a schematic diagram illustrating an example of an HVAC system.

The cooling system 200 can include one or more heater cores 250 to transfer heat from the coolant 210 to air flowing into an interior of the vehicle 100. The heater core(s) 250 can be any heat exchanging device configured to transfer heat to air. In one or more arrangements, the heater core(s) 250 can have similar structure to that of the radiator(s) 230. For instance, the heater core(s) 250 can include one or more tubes and/or one or more fins. As shown in FIG. 2 and described in greater detail below, the coolant 210 flowing through the heater core(s) 250 can transfer heat to air being blown into the interior of the vehicle 100.

The cooling system 200 can include one or more accessory cooling heat exchangers 260 to cool one or more vehicle accessories. The accessory cooling heat exchanger(s) 260 can have any suitable configuration to transfer heat from a solid or a fluid to the coolant 210. For instance, the accessory cooling heat exchanger(s) 260 can allow the coolant 210 to travel near to a vehicle accessory such that heat from the vehicle accessory is transferred to the coolant 210. In one or more arrangements, the heater core(s) 250 can be positioned in parallel to the accessory cooling heat exchanger(s) 260. As used herein, "positioned in parallel to" can include any condition in which coolant 210 can flow through two alternative paths from a common starting point.

In one or more arrangements, the accessory cooling heat exchanger(s) 260 can transfer heat from a fluid within the vehicle 100. For example, the accessory cooling heat exchanger(s) 260 can include a transmission cooler. The transmission cooler can transfer heat from a transmission fluid to the coolant 210. In one or more arrangements, the accessory cooling heat exchanger(s) 260 can include one or more tubes and/or one or more fins that are configured for contact with the transmission fluid.

In one or more arrangements, the accessory cooling heat exchanger(s) 260 can transfer heat from other vehicle components. For example, the accessory cooling heat exchanger(s) 260 can include a battery cooler. The battery cooler can be configured to transfer heat from the battery 104 to the coolant 210.

The cooling system 200 can include one or more valves 270 to control the flow of the coolant 210 through the cooling system 200. In one or more arrangements, the valve(s) 270 can include flow shut valves (FSVs) that are configured to selectively restrict the flow of a fluid or allow the passage of the fluid through the valve 270. In some arrangements, the valve(s) 270 can be switched from an open position and a closed position. In the open position, the valve(s) 270 can allow the passage of coolant 210 through the valve. In the closed position, the valve(s) 270 can prevent and/or restrict the flow of the coolant 210. In one or more arrangements, the configuration of the valve(s) 270 can be controlled by the controller(s) 106. For example, the controller(s) 106 can cause the valve(s) 270 to switch between the open and closed positions.

In one or more arrangements, the valve(s) 270 can control the flow of the coolant 210 in particular areas of the cooling system 200. For example, the valves 270 can include a heater core valve 272 and an accessory cooling valve 274 as described below and shown in FIGS. 4A and 4B. The heater core valve 272 can control the flow of the coolant 210 through a heater core conduit 224 and the heater core 250. The accessory cooling valve 274 can control the flow of the coolant 210 through an accessory conduit 226 and the accessory cooling heat exchanger 260.

The cooling system 200 can include one or more pumps 280 to cause the coolant 210 to flow through the cooling system 200. The pump(s) 280 can be configured to circulate the coolant 210 through the conduit 220, radiator(s) 230, the heater core(s) 250, the accessory cooling heat exchanger(s) 260, and/or the valve(s) 270. In some arrangements, the pump(s) 280 can be powered by the engine 102 and/or the battery 104. For example, the pump(s) 280 can include a centrifugal pump coupled to the engine 102. In one or more arrangements, the controller(s) 106 can cause the pump(s) 280 to be operated.

The cooling system 200 can include one or more sensors 290. The one or more sensors 290 can detect, determine, assess, monitor, measure, quantify and/or sense aspects of the vehicle 100 in real-time. In arrangements in which there are a plurality of sensors 290, the sensors can work independently from each other. Alternatively, two or more of the sensors can work in combination with each other. In such case, the two or more sensors can form a sensor network. The sensors 290 can be operatively connected to the controller(s) 106, the memory 108, and/or other elements of the cooling system 200 and/or the vehicle 100 (including any of the elements shown in FIG. 1).

The sensors 290 can include one or more coolant temperature sensors 292. The coolant temperature sensor(s) 292 can sense a coolant temperature, which can be a temperature of the coolant 210 at one or more locations within the cooling system 200. The coolant temperature sensor(s) 292 can be any suitable sensor. For example, the coolant temperature sensor(s) 292 can include a mechanical thermometer, a bimetal sensor, a thermistor, a thermocouple, a resistance thermometer, and/or a silicon bandgap sensor. In one or more arrangements, the coolant temperature sensor(s) 292 can be at least partially located within, on, or proximate to the engine 102, the conduit 220, the radiator(s) 230, the heater core(s) 250, and/or the accessory cooling heat exchanger(s) 260.

The sensors 290 can include one or more engine oil temperature sensors 294. The engine oil temperature sensor(s) 294 can sense a temperature of an engine oil. The engine oil temperature sensor(s) 294 can be any suitable sensor that can sense an engine oil temperature. For example, the engine oil temperature sensor(s) 294 can include a mechanical thermometer, a bimetal sensor, a thermistor, a thermocouple, a resistance thermometer, and/or a silicon bandgap sensor. In one or more arrangements, the engine oil temperature sensor(s) 294 can be at least partially located within, on, or proximate to a vehicle engine. For example, the engine oil temperature sensor(s) 294 can be located within an oil pan of an engine of vehicle 100.

The sensors 290 can include one or more transmission fluid temperature sensors 296. The transmission fluid temperature sensor(s) 296 can sense a temperature of a transmission fluid, such as a transmission oil. The transmission fluid temperature sensor(s) 296 can be any suitable sensor that can sense a transmission fluid temperature. For example, the transmission fluid temperature sensor(s) 296 can include a mechanical thermometer, a bimetal sensor, a thermistor, a thermocouple, a resistance thermometer, and/or a silicon bandgap sensor. In one or more arrangements, the transmission fluid temperature sensor(s) 296 can be at least partially located within, on, or proximate to one or more components of a vehicle transmission.

The HVAC system 300 can be configured to change the environment or climate of an interior compartment of the vehicle 100. Some of the possible elements of the HVAC system 300 are shown in FIG. 1 and will be described. It will be understood that it is not necessary for the HVAC system 300 to have all of the elements shown in FIG. 1 or described herein. The HVAC system 300 can have any combination of the various elements shown in FIG. 1. Further, the HVAC system 300 can have additional elements to those shown in FIG. 1.

The HVAC system 300 can include an air conditioning (AC) system 310. The AC system can have any configuration to allow for cooling and/or humidity control for at least a portion of the vehicle 100. In one or more arrangements, the AC system 310 can include a refrigerant (not shown), a compressor 312, a condenser 314, an evaporator 316, and/or an expansion valve 318. The various elements of the AC system 310 can be arranged in any suitable manner and/or can be operatively connected to each other in any suitable manner.

The compressor 312 can be configured to direct or facilitate the movement of refrigerant throughout the AC system 310. In one or more arrangements, the compressor 312 can increase the pressure of the refrigerant vapor, such as by reducing a volume of the vapor. The higher pressure of the refrigerant vapor can increase the temperature of the refrigerant.

The compressor 312 can have any suitable configuration for the AC system 310. As non-limiting examples, the compressor 312 can include a rotary compressor, a reciprocating compressor, a centrifugal compressor, and/or an axial compressor. The compressor 312 can be powered by any suitable power source within the vehicle 100. In one or more arrangements, the compressor 312 can be coupled to, and powered by, the engine 102. For example, a belt can be used to transfer rotational energy from the engine 102 to the compressor 312. In one or more arrangements, the compressor 312 can be a fixed compressor. As used herein, "fixed compressor" or "fixed displacement compressor" can include any compressor having a constant pumping capacity. Alternatively or in addition, the compressor 312 can be a variable compressor. As used herein, "variable compressor" or "variable displacement compressor" can include any compressor configured to vary a pumping capacity over time.

The condenser 314 can be configured to cool and condense the refrigerant to a liquid state. The condenser 314 can have any suitable configuration for the AC system 310. In one or more arrangements, the condenser 314 be any form of a heat exchanger. For example, the condenser 314 can include coiled tubing. In some arrangements, fins can be connected to the tubing to increase a surface area of a material that is in contact with the refrigerant. In one or more arrangements, the condenser 314 can be configured to allow a fluid, such as air, to be directed through the condenser 314. For example, a fan can be operated in close proximity to the condenser to blow air across the coils and/or fins.

The evaporator 316 can be configured to allow and/or cause the transition of a refrigerant from a liquid state to a gaseous state. The evaporator 316 can allow heat transfer between the refrigerant and air surrounding the evaporator 316. In one or more arrangements, the evaporator 316 can include coiled tubes for the refrigerant to be routed through. Hotter air can be blown across the evaporator 316. In one or more arrangements, the air moving across the evaporator 316 heats the refrigerant to a warmer temperature and ultimately evaporating the refrigerant from a liquid state to a gaseous state. The air being blown across the evaporator 316 can be cooled and routed into the passenger compartment of the vehicle 100.

The expansion valve 318 can be configured to facilitate change in pressures of the refrigerant. For instance, the expansion valve 318 can be located between the condenser 314 and the evaporator 316. In one or more arrangements, the expansion valve 318 can be configured to allow the liquid refrigerant to undergo an abrupt decrease in pressure and decrease in temperature as the refrigerant moves from the condenser 314 to the evaporator 316.

The HVAC system 300 can include one or more power sources 320 to provide mechanical or electrical power to one or more elements of the HVAC system 300. In one or more arrangements, the power source(s) 320 can include the engine 102 and/or the battery 104. Alternatively or in addition, the power source(s) 320 can include other power sources. For example, the power source(s) 320 can include additional batteries and/or generators.

The HVAC system 300 can include one or more blowers 330 to direct and/or cause the movement of air or other fluid/gas. As used herein, "air" can include any gaseous fluid. For example, air can include environmental gas in and/or around the vehicle 100. The blower(s) 330 can be configured to direct and/or cause the movement of air into a passenger compartment of the vehicle 100. In one or more arrangements, the blower(s) 330 can be configured to move air across the evaporator 316 when the AC system 310 is being operated. In one or more arrangements, the blower(s) 330 can include a blower motor and one or more fans to move a quantity of air past the evaporator 316 and through air ducts into the passenger compartment of the vehicle 100. For instance, the blower(s) 330 can direct air over tubing and/or coils of the evaporator 316 to allow the refrigerant flowing through the evaporator 316 to remove heat from the air. In one or more arrangements, the blower(s) 330 can be powered by the engine 102, the battery 104, and/or the power source(s) 320.

The HVAC system 300 can include one or more intake mode switches 340 to control the source of air being introduced to the HVAC system 300 and/or the vehicle 100. In one or more arrangements, the intake mode switch(es) 340 can be configured to allow the selection of a source of air being introduced to the blower(s) 330. For instance, the source of air can be outside of a passenger compartment and/or outside of the vehicle 100, referred to as "fresh mode air source". Additionally, the source of air can be within the passenger compartment, referred to as "recirculation mode air source." In one or more arrangements, the intake mode switch(es) 340 can be operated to change the air source selection between a fresh mode air source, a recirculation mode air source, and/or a mix of both modes.

The HVAC system 300 can include one or more air mix doors 350 to direct air towards or away from the heater core 250. In one or more arrangements, the air mix door(s) 350 can be positioned such that substantially all, some, or substantially none of the air being directed towards the interior of the vehicle 100 passes through the heater core 250. In one or more arrangements, the controller(s) 106 can control the positioning of the air mix door(s) 350. The positioning of the air mix door(s) 350 can be based on one or more factors. For example, the air mix door(s) 350 can be positioned based on whether air should be heated by the warmer heater core(s) 250 prior to entering the interior of the vehicle. Alternatively or in addition, the air mix door(s) 350 can be positioned based on whether cooling of the heater core(s) 250 (by the cooler air moved by the blower 330) is desired.

The HVAC system 300 can include one or more user interface(s) 360. In one or more arrangements, the user interface(s) 360 can include an input system and/or an output system. An "input system" includes any device, component, system, element or arrangement or groups thereof that enable information/data to be entered into a machine. The input system can receive an input from a vehicle occupant (e.g. a driver or a passenger). Any suitable input system can be used, including, for example, a keypad, display, touch screen, multi-touch screen, button, joystick, mouse, trackball, microphone and/or combinations thereof. An "output system" includes any device, component, system, element or arrangement or groups thereof that enable information/data to be presented to a vehicle occupant (e.g. a person, a vehicle occupant, etc.). The output system can present information/data to a vehicle occupant. The output system can include a display. Alternatively or in addition, the output system may include a microphone, earphone and/or speaker. Some components of the vehicle 100 may serve as both a component of the input system and a component of the output system. In one or more arrangements, the user interface(s) 360 can include a vehicle head unit.

The HVAC system 300 can include one or more HVAC sensors 370. The one or more HVAC sensors 370 can detect, determine, assess, monitor, measure, quantify and/or sense aspects of the HVAC system 300 in real-time. In arrangements in which there are a plurality of HVAC sensors 370, the sensors can work independently from each other. Alternatively, two or more of the sensors can work in combination with each other. In such case, the two or more sensors can form a sensor network. The HVAC sensors 370 can be operatively connected to the controller(s) 106, the memory 108, and/or other elements of the HVAC system 300 (including any of the elements shown in FIG. 1).

The HVAC sensors 370 can include one or more ambient temperature sensors 372. The ambient temperature sensor(s) 372 can be configured to sense an ambient temperature outside of the vehicle 100. As used herein, "ambient temperature" includes the air temperature of at least a portion of the surrounding environment of the vehicle 100. For instance, the ambient temperature can be the air temperature near an exterior portion of the vehicle 100. The ambient temperature sensor(s) 372 can be any suitable sensor, including mechanical, electrical, and/or integrated circuit temperature sensors that can detect, determine, assess, monitor, measure, quantify, and/or sense an ambient temperature. For example, the ambient temperature sensor(s) 372 can include a mechanical thermometer, a bimetal sensor, a thermistor, a thermocouple, a resistance thermometer, and/or a silicon bandgap sensor. In one or more arrangements, the ambient temperature sensor(s) 372 can be at least partially located at, on, or proximate to an exterior surface of the vehicle 100. In some arrangements, the ambient temperature sensor(s) 372 can be separate from the vehicle 100. For instance, the vehicle 100 can receive signals from an exterior ambient temperature sensor 372. In some examples, the vehicle can receive ambient temperature information from a weather service, a remote server, or application software.

The HVAC sensors 370 can include one or more internal temperature sensors 374. The internal temperature sensor(s) 374 can be configured to detect, determine, assess, monitor, measure, quantify, and/or sense an internal temperature of the vehicle 100. "Internal temperature" means an air temperature of at least a portion of a passenger compartment of a vehicle. The internal temperature sensor(s) 374 can be any suitable sensor, including mechanical, electrical, and/or integrated circuit temperature sensors. For example, the internal temperature sensor(s) 374 can include a mechanical thermometer, a bimetal sensor, a thermistor, a thermocouple, a resistance thermometer, and/or a silicon bandgap sensor.

The HVAC sensors 370 can include one or more evaporator temperature sensors 376 to detect, determine, assess, monitor, measure, quantify, and/or sense a temperature of at least a portion of the evaporator 316 of the AC system 310. The evaporator temperature sensor(s) 376 can be any suitable sensor, including mechanical, electrical, and/or integrated circuit temperature sensors. For example, the evaporator temperature sensor(s) 376 can include a mechanical thermometer, a bimetal sensor, a thermistor, a thermocouple, a resistance thermometer, and/or a silicon bandgap sensor. In one or more arrangements, the evaporator temperature sensor(s) 376 can be configured to be in direct physical contact with a portion of the evaporator 316. For instance, the evaporator temperature sensor(s) 376 can sense the temperature of an interior and/or exterior surface of the evaporator 316. Alternatively or in addition, the evaporator temperature sensor(s) 376 can be spaced from the evaporator 316. The evaporator temperature sensor(s) 376 can be provided in one or more locations relative to the evaporator 316. In some arrangements, the evaporator temperature sensor(s) 376 can be provided at a portion of the evaporator 316 known to have the coldest temperature.

In addition to the above sensors, the HVAC sensors 370 can include one or more other sensors 378. The other sensor(s) 378 can be configured to sense one or more conditions of the interior or exterior of the vehicle 100. The controller(s) 106 can use information received by the other sensor(s) 378 to determine conditions for the AC system 310. In one or more arrangements, the other sensor(s) 378 can include a humidity sensor configured to sense a humidity of an interior or exterior portion of the vehicle 100. In one or more arrangements, the other sensor(s) 378 can include a solar sensor configured to sense a solar load at portions of the vehicle 100.

The vehicle 100 can include one or more actuators 380. The actuators 380 can be any element or combination of elements operable to modify, adjust and/or alter one or more components of the cooling system 200, the HVAC system 300 and/or the vehicle 100 responsive to receiving signals or other inputs from the controller(s) 106. Any suitable actuator can be used. For instance, the one or more actuators 380 can include motors, pneumatic actuators, hydraulic pistons, relays, solenoids, and/or piezoelectric actuators, just to name a few possibilities.

In one or more arrangements, the HVAC system 300 can operate components of the AC system 310 to cool down the passenger compartment of the vehicle 100. To do so, the controller(s) 106 can use information received by the HVAC sensors 370 and/or the user interface(s) 360. For instance, the controller(s) 106 can determine a target internal temperature for the passenger compartment based the user interface(s) 360, an ambient temperature, an internal temperature and/or other factors.

During operation of the HVAC system 300, the evaporator temperature can directly affect the temperature of air being introduced to the interior of the vehicle 100. For instance, the cooler the evaporator temperature, the cooler the air being introduced to the interior. With this in mind, the HVAC system 300 can be operated based on a target evaporator outlet (TEO) temperature. As used herein, "target evaporator outlet temperature" or "TEO temperature" is any desired temperature for an outlet portion of the evaporator 316 during operation of the HVAC system 300.

In one or more arrangements, the compressor 312 can be operated at least in part based on the TEO temperature. The evaporator temperature can be inversely related to the amount of fluid pumped by the compressor 312. For instance, more fluid moved by the compressor 312 can result in lower temperatures within the evaporator 316. In arrangements where the compressor 312 is a fixed compressor, the compressor 312 can be alternated between active (ON) and inactive (OFF) states. Operating the compressor 312 with longer activated periods and/or shorter deactivated periods can cool the evaporator 316 to a lower temperature. In arrangements in which the compressor 312 is a variable compressor, the evaporator temperature can be altered based on a speed of the compressor. For example, the variable compressor can be operated at a higher speed to reduce the evaporator temperature. In one or more arrangements, the controller(s) 106 can control the operation of the compressor 312 based on a TEO temperature. For instance, the controller(s) 106 can control the compressor 312 based on the TEO temperature and information received from the ambient temperature sensor(s) 372, the internal temperature sensor(s) 374, the evaporator temperature sensor(s) 376, and/or the other sensor(s) 378.

In one or more arrangements, the HVAC system 300 can operate under a maximum cooling condition. As used herein, "maximum cooling condition" can include any situation in which the HVAC system 300 is operated in response to a request for maximum cooling in the interior of the vehicle 100. In some arrangements, the maximum cooling condition can be based on input from the user interface(s) 360. For example, an occupant of the vehicle 100 can provide an input requesting maximum cooling. The input for maximum cooling can in be in any suitable form. For instance, the input for maximum cooling can be in the form of a temperature, such as a lowest temperature setting. Alternatively or in addition, the input can be in other forms, such as the selection of a coldest setting via one or more buttons and/or knobs.

In one or more arrangements, the maximum cooling condition can be based on determinations made by the controller(s) 106. For instance, the controller(s) 106 can determine whether or not the HVAC system 300 should operate in the maximum cooling mode. Such determinations can be made by the controller(s) 106 based on information from the HVAC sensors 370. For example, the controller(s) 106 can cause the HVAC system 300 to operate in the maximum cooling condition based on an ambient temperature, an internal temperature, an evaporator temperature, and/or the status sensed by the other sensor(s) 378.

In one or more arrangements, the maximum cooling condition can include situations in which the coldest possible air is desired to be introduced to the interior of the vehicle 100. For instance, the maximum cooling condition can include conditions in which a minimum TEO is selected.

In one or more arrangements, the maximum cooling condition can include situations in which the compressor 312 is operated at a maximum setting. For instance, the compressor 312 can be operated at a highest speed (if a variable compressor) or with the greatest percentage of time in an ON state (for a fixed compressor) during the maximum cooling condition.

In some arrangements, the source of air being introduced to the blower(s) 330 can be switched to the recirculation mode air source during the maximum cooling condition.

As described in further detail below, the cooling system 200 of the vehicle 100 can be controlled based on whether or not the HVAC system 300 is being operated in the maximum cooling mode.

Referring now to FIG. 2, a portion of the HVAC system 300 is shown. In one or more arrangements, the intake mode switch 340 can move to allow recirculated air and/or fresh air into the system. For example, the intake mode switch 340 can include a door that is movable between a first position that allows only fresh air to the blower 330, and a second position that allows only recirculated air to the blower 330. In one or more arrangements, the blower 330 can be activated to move air towards and through the evaporator 216. In one or more arrangements, the HVAC system 300 can include the heater core 250 of the cooling system 200 to heat air traveling to the interior of the vehicle 100. An air mix door 334 can be included in the HVAC system 300 to direct air towards or away from the heater core 250. In one or more arrangements, warm coolant can heat the heater core 250. The heat from the heater core 250 can be transferred to air surrounding the heater core 250. In some arrangements, heat can be transferred from the heater core 250 to air entering the interior of the vehicle 100 even when the air mix door 334 directs air away from the heater core 250.

Figure 3:
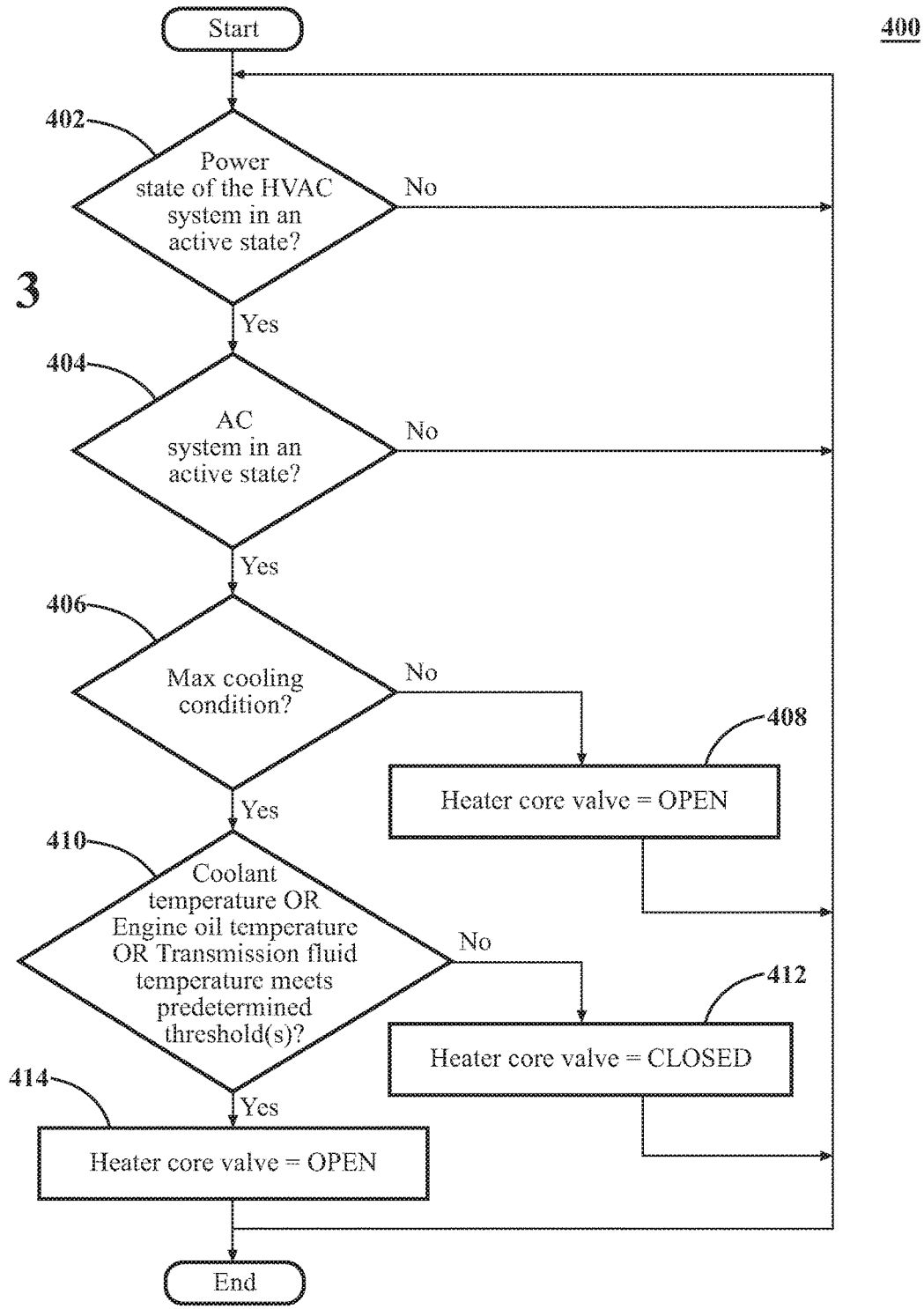
FIG. 3 is a flow diagram illustrating an example of a method of operating the vehicle cooling system.

Now that the various potential systems, devices, elements and/or components of the vehicle 100 have been described, various methods to operate a vehicle cooling system will now be described. Referring now to FIG. 3, an example of a method 400 of operating a cooling system is shown. Various possible steps of method 400 will now be described. The method 400 illustrated in FIG. 3 may be applicable to the embodiments described above in relation to FIGS. 1, 2, 4A, and 4B, but it is understood that the method 400 can be carried out with other suitable systems and arrangements. Moreover, the method 400 may include other steps that are not shown here, and in fact, the method 400 is not limited to including every step shown in FIG. 3. The steps that are illustrated here as part of the method 400 are not limited to this particular chronological order. Indeed, some of the steps may be performed in a different order than what is shown and/or at least some of the steps shown can occur simultaneously. In one or more arrangements, one or more steps of the method 400 can be performed by the controller(s) 106.

At block 402, the method 400 can determine whether a power state of the HVAC system 300 is in an active state. The HVAC system 300 can be in an active state when, for example, any of its components (such as those shown in FIG. 1) are being operated. In one or more arrangements, the determination can be made by the controller(s) 106. If it is determined that the HVAC system 300 is not in an active state, the method 400 can return to block 402 or the method 400 can end. If it is determined that the HVAC system 300 is in an active state, the method can continue to block 404.

At block 404, it can be determined whether a power state of the AC system 310 is in an active state. The AC system 310 can be in an active state when the compressor 312 is operating and in an ON state. In one or more arrangements, the determining can be done by the controller(s) 106. If it is determined that the AC system 310 is not in an active state, the method 400 can return to block 402 or the method 400 can end. If it is determined that the HVAC system 300 is in an active state, the method can continue to block 406.

In one or more arrangements, the controller(s) 106 can determine if the HVAC system 300 and/or the AC system 310 is in an active state based on flags stored in the memory 108. As used herein, a "flag" can include any information stored in the memory 108 indicative of a status of one or more vehicle systems, such as the engine 102 and/or compressor 312. In one or more arrangements, each time an operational status of the engine 102 and/or the compressor 312 is changed (e.g., turned on or off), the status of a flag can be changed. Alternatively or in addition, each time the operational status of the engine 102 and/or the compressor 312 is changed a new flag can be generated in the memory 108.

At block 406, it can be determined whether the HVAC system is operating under maximum cooling condition. In one or more arrangements, the determining can be done by the controller(s) 106, the memory 108, and/or any of HVAC sensors 370. For example, a flag can be generated in the memory 108 when the HVAC system 300 is operated in a maximum cooling condition. The maximum cooling condition can be requested by an occupant via the user interface(s) 360, the controller(s) 106, and/or the HVAC sensors 370.

If it is determined that the maximum cooling condition is not selected, the method 400 can continue to block 408. At block 408, a heater core valve can be set to an open position. When the flow shut valve is in the open position, the coolant 210 can be allowed to flow through the heater core 250.

If it is determined that the maximum cooling condition is selected, the method 400 can continue to block 410. At block 410, it can be determined whether a vehicle fluid temperature meets an associated predetermined threshold. In some arrangements, in can be determined whether one or more of a set of vehicle fluid temperatures meet associated predetermined thresholds. As used herein, "set" can include one or more items. For example, the set of vehicle fluid temperatures can include a coolant temperature, an engine oil temperature, and/or a transmission fluid temperature. As used herein, "associated predetermined threshold" means a predetermined threshold for a particular vehicle fluid temperature. For example, the associated predetermined thresholds can include a coolant temperature threshold, an engine oil temperature threshold, and a transmission fluid temperature threshold. In some arrangements, the associated predetermined thresholds can include a value or range of values. For example, the associated predetermined thresholds can be temperature values. In one or more arrangements, the associated predetermined thresholds can remain constant over time. Alternatively, the associated predetermined thresholds can vary over time, based on one or more factors.

In some arrangements, it can be determined whether a coolant temperature is greater than or equal to a coolant temperature threshold, whether an engine oil temperature is greater than or equal to an engine oil temperature threshold, and/or whether a transmission fluid temperature is greater than or equal to a transmission fluid temperature threshold. In one or more arrangements, the determining can be done by the controller(s) 106 and/or the sensors 290.

If it is determined that the coolant temperature is not greater than or equal to the coolant temperature threshold, that the engine oil temperature is not greater than or equal to the engine oil temperature threshold, and that the transmission fluid temperature is not greater than or equal to the transmission fluid temperature threshold, the method 400 can continue to block 412. At block 412, the heater core valve can be set to a closed position. When the flow shut valve is in the closed position, less coolant 210 can flow through the heater core 250 than when the heater core valve is in the open position. In some arrangements, this can reduce the amount of heat transferred from the heater core 250 to air that is being blown into the interior of the vehicle 100.

If it is determined that the coolant temperature is greater than or equal to a coolant temperature threshold, that the engine oil temperature is greater than or equal to an engine oil temperature threshold, and/or that the transmission fluid temperature is greater than or equal to a transmission fluid temperature threshold, the method 400 can continue to block 414. At block 414, the heater core valve can be set to the open position. In some arrangements, this can increase the amount of heat transferred from the coolant 210 in the heater core 250 to the air being blown into the interior of the vehicle. More heat rejection from the coolant 210 can allow the cooling system 200 to provide more cooling to the engine and/or transmission.

Non-limiting examples of the operation of the vehicle 100 and the cooling system 200 in accordance with the method 400 will now be described with reference to FIGS. 4A and 4B. For purposes of this example, the vehicle 100 can include the engine 102 and the cooling system 200. Further, the vehicle 100 can include an HVAC system 300 and an AC system 310 to provide cooling to a passenger compartment. The HVAC system 300 can be operated under a maximum cooling condition.

In one or more arrangements, the cooling system 200 can include the coolant 210 moveable within the conduit 220, the radiator 230, the heater core 250, and the accessory cooling heat exchanger 260. The conduit can include a first conduit 222, the heater core conduit 224, and the accessory conduit 226. The cooling system 200 can also include one or more valves 270, such as a heater core valve 272 and an accessory cooling valve 274.

In one or more arrangements, the cooling system 200 can be controlled based on a status of the HVAC system 300. For instance, the valves 270 can be controlled based on whether the HVAC system 300 is operated under a maximum cooling condition. In some arrangements, the controller(s) 106 can determine whether the HVAC system 300 is being operated under a maximum cooling condition. Such determination can be based on a number of factors. For example, the controller(s) 106 can determine that the HVAC system 300 is being operated under the maximum cooling condition based on the user interface(s) 360, the HVAC sensors 390, and/or the memory 108.

If the HVAC system 300 is determined to be operating under a maximum cooling condition, the valves 270 can be controlled based on whether a vehicle fluid temperature meets an associated predetermined threshold. For example, the controller(s) 106 can determine whether one or more of a coolant temperature is greater than or equal to a coolant temperature threshold, whether an engine oil temperature is greater than or equal to an engine oil temperature threshold, and/or whether a transmission fluid temperature is greater than or equal to a transmission fluid temperature threshold.

Figure 4A:
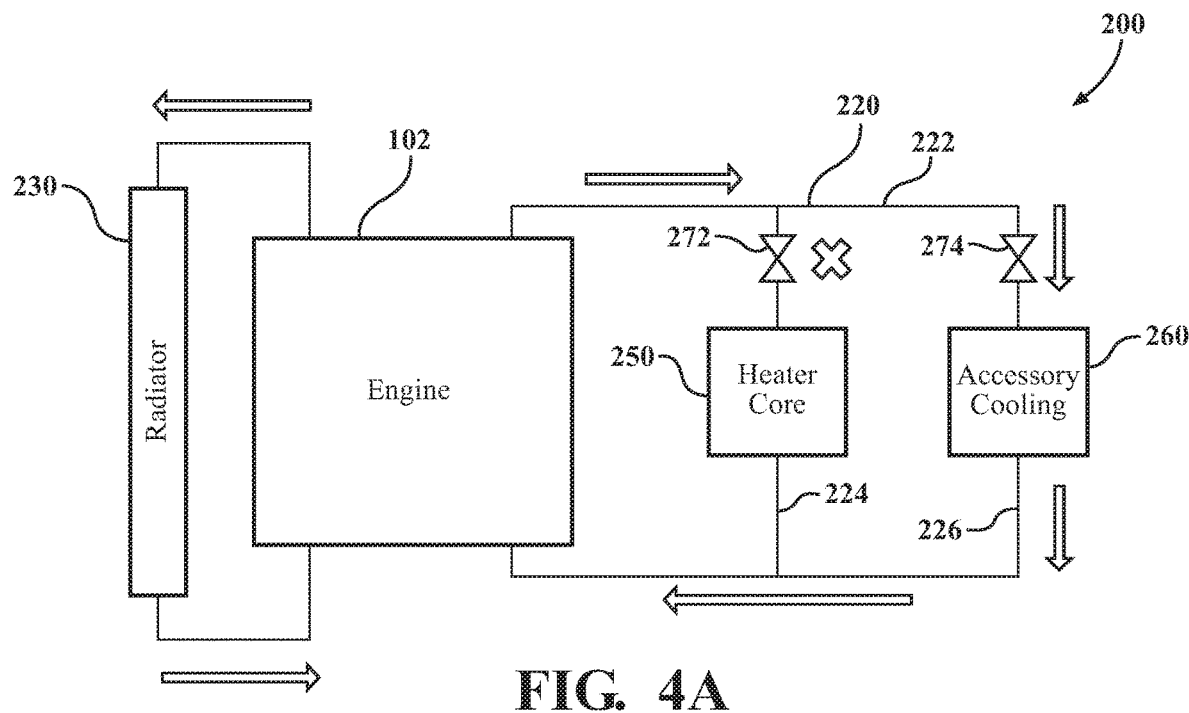
FIG. 4A is a schematic diagram illustrating an example vehicle cooling system in a first mode of operation.

If the vehicle fluid temperatures do not meet the predetermined threshold, the cooling system 200 can be operated as shown in FIG. 4A. In some arrangements, the heater core valve 272 can be moved to the closed position. When in the closed position, the flow of the coolant 210 through the heater core conduit 224 and the heater core 250 slows and/or ceases. The controller(s) 106 can control the state of the heater core valve 272. By reducing or ceasing the flow of coolant 210 through the heater core 250, the temperature of the heater core 250 can decrease. As the temperature of the heater core 250 decreases, less heating of the air being introduced to the interior of the vehicle 100 by the HVAC system 300 can be achieved.

Figure 4B:
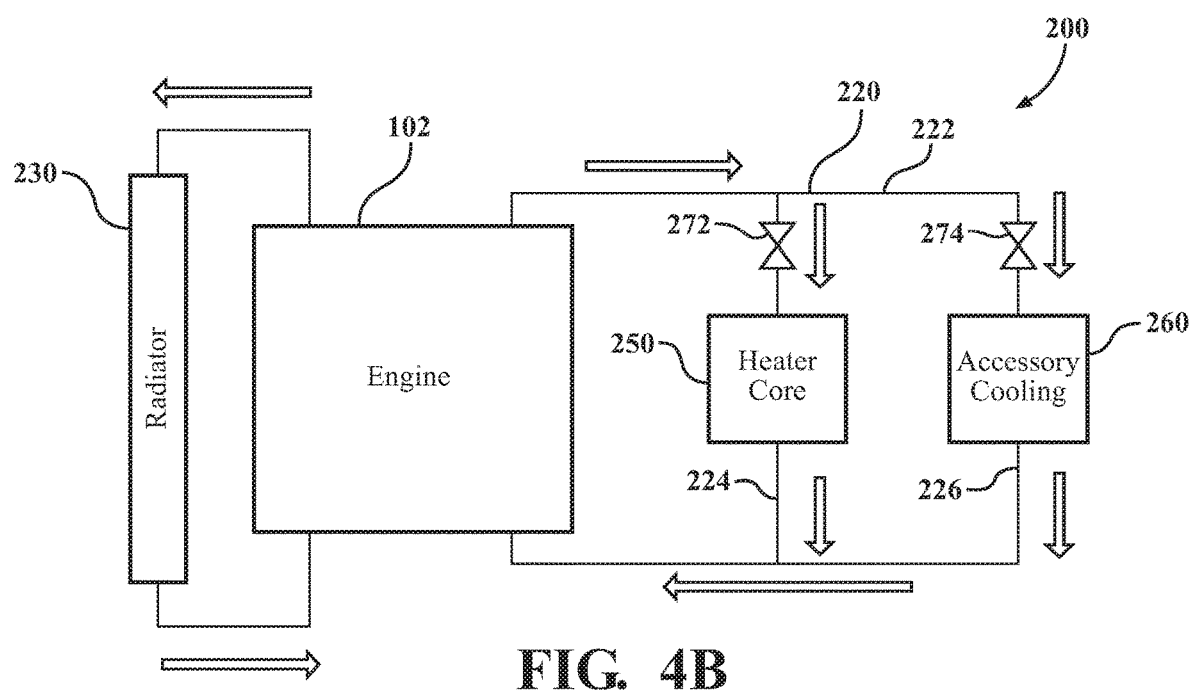
FIG. 4B is a schematic diagram illustrating the example vehicle cooling system of FIG. 4A in a second mode of operation.

If one or more vehicle fluid temperatures meet the associated predetermined thresholds, the cooling system 200 can be operated as shown in FIG. 4B. In some arrangements, the heater core valve 272 can be moved to the open position. When in the open position, the coolant 210 is allowed to flow through the heater core conduit 224 and the heater core 250. By allowing the flow of coolant 210 through the heater core, heat can transfer from the coolant 210 to surrounding air near the heater core 250. In some instances, the coolant 210 can decrease in temperature as it moves through the heater core 250, while the temperature of the heater core 250 increases. The increased heat rejection from the coolant 210 during this can allow for more cooling of other vehicle components (e.g., the engine 102, a transmission, and/or a battery).

It will be appreciated that arrangements described herein can provide numerous benefits, including one or more of the benefits mentioned herein. Arrangements described herein can cause coolant within a vehicle cooling system to flow through a heater core even when an HVAC system is operating under a maximum cooling condition. This can result in heat rejection from the coolant within the heater core, allowing for more efficient cooling of other vehicle components. Such arrangements can include controllers that automatically open a valve to force coolant through the heater core based on the temperature of one or more vehicle components. This can help reduce the temperature of the coolant, an engine oil, and/or a transmission fluid. Arrangements can increase the tow capacity of the vehicle and prevent heat damage to exhaust surrounding parts.

The flowcharts and block diagrams in the figures illustrate the architecture, functionality, and operation of possible implementations of systems, methods and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied or embedded, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g. AB, AC, BC or ABC).

Aspects herein can be embodied in other forms without departing from the spirit or essential attributes thereof. Accordingly, reference should be made to the following claims, rather than to the foregoing specification, as indicating the scope of the invention.

What is claimed is:

1. A method of controlling a cooling system of a vehicle, the cooling system providing a flow path for a coolant, the cooling system including a heater core positioned in parallel with at least one accessory cooling heat exchanger, the cooling system further including a heater core valve configured to control a flow rate of coolant through the heater core, the method comprising:

determining whether an air conditioning (AC) system of the vehicle is being operated under a maximum cooling condition;

responsive to determining that the AC system is being operated under the maximum cooling condition, determining whether two or more of a set of vehicle fluid temperatures meet associated predetermined thresholds, the set of vehicle fluid temperatures including a coolant temperature, an engine oil temperature, and a transmission fluid temperature, wherein one or more of the set of vehicle fluid temperatures meet the associated predetermined thresholds when one or more of the coolant temperature is greater than or equal to a coolant temperature threshold, the engine oil temperature is greater than or equal to an engine oil temperature threshold, or the transmission fluid temperature is greater than or equal to a transmission fluid temperature threshold;

when each of the vehicle fluid temperatures of the set of vehicle fluid temperatures do not meet the associated predetermined thresholds, switching the heater core valve to a closed position to reduce a flow rate of the coolant through the heater core; and when two or more of the set of vehicle fluid temperatures meet the associated predetermined thresholds, switching the heater core valve to an open position to increase the flow rate of the coolant through the heater core.

2. The method of claim 1, wherein determining whether the AC system of the vehicle is being operated under the maximum cooling condition includes determining whether a compressor of the AC system is being operated for a maximum displacement.

3. The method of claim 1, wherein determining whether the AC system of the vehicle is being operated under the maximum cooling condition includes determining whether an occupant of the vehicle has selected a maximum cooling setting via a user input.

4. The method of claim 1, wherein determining whether the AC system of the vehicle is being operated under the maximum cooling condition includes determining whether the AC system is running based on a minimum target evaporator outlet (TEO) temperature.

5. The method of claim 1, further comprising:
when one or more of the set of vehicle fluid temperatures meet the associated predetermined thresholds, causing air to be blown across the heater core.

6. The method of claim 1, further comprising:
when one or more of the set of vehicle fluid temperatures meet the associated predetermined thresholds, determining whether the one or more of the set of vehicle fluid temperatures change such that each of the vehicle fluid temperatures of the set of vehicle fluid temperatures do not meet the associated predetermined thresholds; and switching the heater core valve from the open position to the closed position.

7. A method of controlling a cooling system of a vehicle, the cooling system providing a flow path for a coolant, the cooling system including a heater core positioned in parallel with at least one accessory cooling heat exchanger, the cooling system further including a heater core valve configured to control a flow rate of coolant through the heater core, the method comprising:

determining whether an air conditioning (AC) system of the vehicle is in an ON state;

determining whether the AC system is being operated under a maximum cooling condition;

responsive to determining that the AC system is being operated under the maximum cooling condition, switching the heater core valve to a closed position;

determining whether two or more of a set of vehicle fluid temperatures meet associated predetermined thresholds, the set of vehicle fluid temperatures including a coolant temperature, an engine oil temperature, and a transmission fluid temperature, wherein one or more of the set of vehicle fluid temperatures meet the associated predetermined thresholds when one or more of the coolant temperature is greater than or equal to a coolant temperature threshold, the engine oil temperature is greater than or equal to an engine oil temperature threshold, or the transmission fluid temperature is greater than or equal to a transmission fluid temperature threshold;

when each of the vehicle fluid temperatures of the set of vehicle fluid temperatures do not meet the associated predetermined thresholds, switching the heater core valve to a closed position to reduce a flow rate of the coolant through the heater core; and when two or more of the set of vehicle fluid temperatures meet the associated predetermined thresholds, switching the heater core valve to an open position.

8. The method of claim 7, wherein determining whether the AC system of the vehicle is being operated under the maximum cooling condition includes determining whether a compressor of the AC system is being operated for a maximum displacement.

9. The method of claim 7, wherein determining whether the AC system of the vehicle is being operated under the maximum cooling condition includes determining whether an occupant of the vehicle has selected a maximum cooling setting via a user input.

10. The method of claim 7, wherein determining whether the AC system of the vehicle is being operated under the maximum cooling condition includes determining whether the AC system is running based on a minimum target evaporator outlet (TEO) temperature.

11. The method of claim 7, further comprising:
when one or more of the set of vehicle fluid temperatures meet the associated predetermined thresholds, causing air to be blown across the heater core.

12. The method of claim 7, further comprising:
when one or more of the set of vehicle fluid temperatures meet the associated predetermined thresholds, determining whether the one or more of the set of vehicle fluid temperatures change such that each of the vehicle fluid temperatures of the set of vehicle fluid temperatures do not meet the associated predetermined thresholds; and switching the heater core valve from the open position to the closed position.

13. A vehicle cooling system, the system comprising:
a heater core positioned in parallel with at least one accessory cooling heat exchanger;
a heater core valve configured to control a flow rate of coolant through the heater core;
one or more controllers operatively connected to the heater core valve and an air conditioning (AC) system; and
a memory operatively connected to the one or more controllers, the memory storing instructions that, when executed by the one or more controllers, cause the one or more controllers to:
determine whether the AC system of the vehicle is being operated under a maximum cooling condition;
responsive to determining that the AC system is being operated under the maximum cooling condition, determine whether two or more of a set of vehicle fluid temperatures meet associated predetermined thresholds, the set of vehicle fluid temperatures including a coolant temperature, an engine oil temperature, and a transmission fluid temperature, wherein one or more of the set of vehicle fluid temperatures meet the associated predetermined thresholds when one or more of the coolant temperature is greater than or equal to a coolant temperature threshold, the engine oil temperature is greater than or equal to an engine oil temperature threshold, or the transmission fluid temperature is greater than or equal to a transmission fluid temperature threshold;
when each of the vehicle fluid temperatures of the set of vehicle fluid temperatures do not meet the associated predetermined thresholds, cause the heater core valve to be switched to a closed position to reduce a flow rate of the coolant through the heater core; and
when two or more of the set of vehicle fluid temperatures meet the associated predetermined thresholds, cause the heater core valve to switch to an open position to increase the flow rate of the coolant through the heater core.

* * * * *